United States Patent [19]
Khudenko

[11] Patent Number: 5,698,102
[45] Date of Patent: Dec. 16, 1997

[54] LAMELLAR SEPARATOR

[75] Inventor: Boris Mikhailovich Khudenko, Atlanta, Ga.

[73] Assignee: Khudenko Engineering Inc., Atlanta, Ga.

[21] Appl. No.: 666,128

[22] Filed: Jun. 19, 1996

[51] Int. Cl.⁶ .................................................. B01D 21/02
[52] U.S. Cl. ...................... 210/519; 210/521; 210/532.1; 210/539; 210/540
[58] Field of Search ....................................... 210/513, 519, 210/521, 532.2, 539, 540

[56] References Cited

U.S. PATENT DOCUMENTS

| | | | |
|---|---|---|---|
| 4,363,370 | 12/1982 | Gustafsson | 210/521 |
| 4,681,683 | 7/1987 | Lindstol | 210/521 |
| 5,230,794 | 7/1993 | Heijnen et al. | 210/188 |
| 5,340,470 | 8/1994 | Hedrick et al. | 210/519 |

Primary Examiner—David A. Reifsnyder

[57] ABSTRACT

A lamellar separator for clarification of aqueous influents comprising a primary clarification section provided with inclined co-current lamellas fed by the said aqueous influents at the upper ends of the said lamellas and discharging streams of concentrated solids and streams of clarified liquid at the lower end of the said lamellas, and an interception section attached to and being in hydraulic communication with the said primary clarification section at the lower ends of the said lamellas, the said interception section housing at least one interception means, whereby the said streams of concentrated solids are combined into a flow of concentrated solids and the said streams of clarified liquid are combined into a flow of clarified liquid, and the said flow of concentrated solids and the said flow of clarified liquid are evacuated from the said lamellar separator without intermixing.

9 Claims, 9 Drawing Sheets

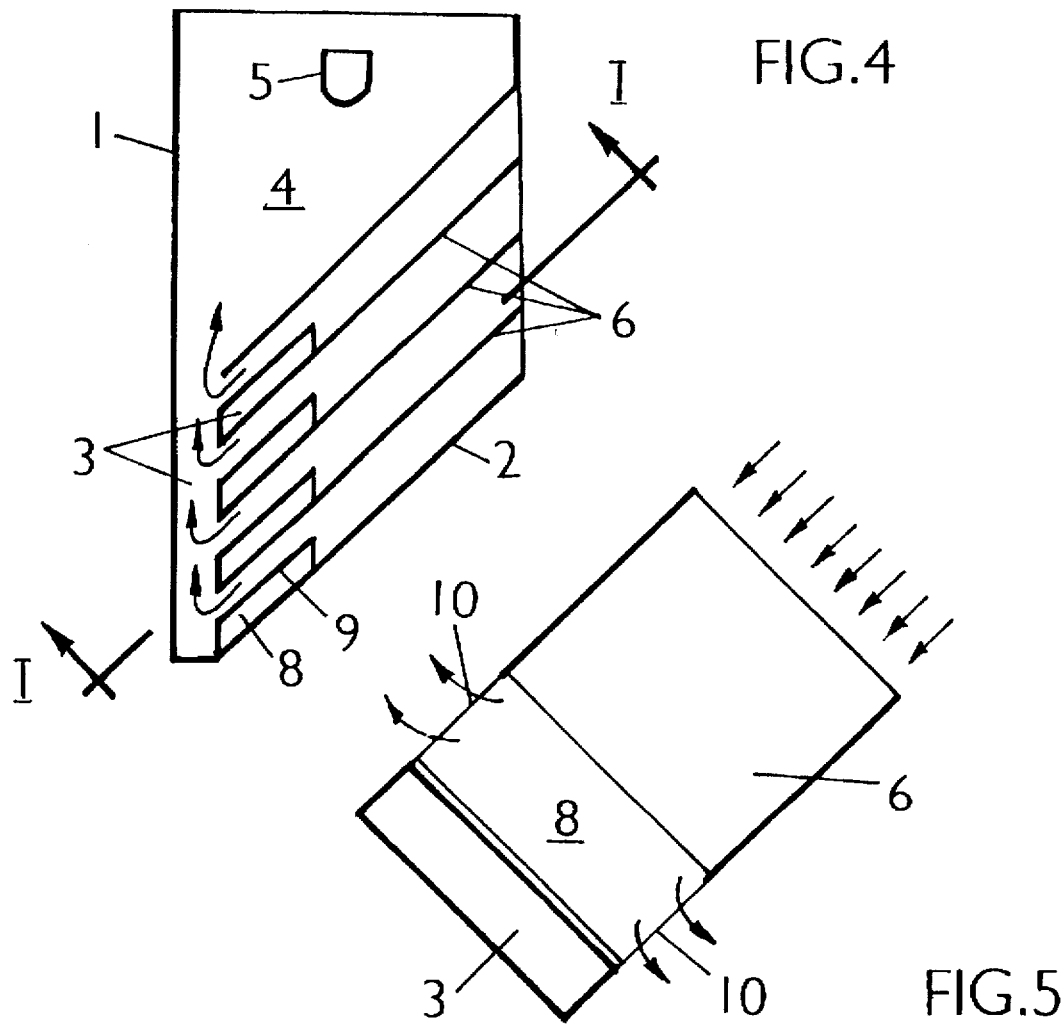

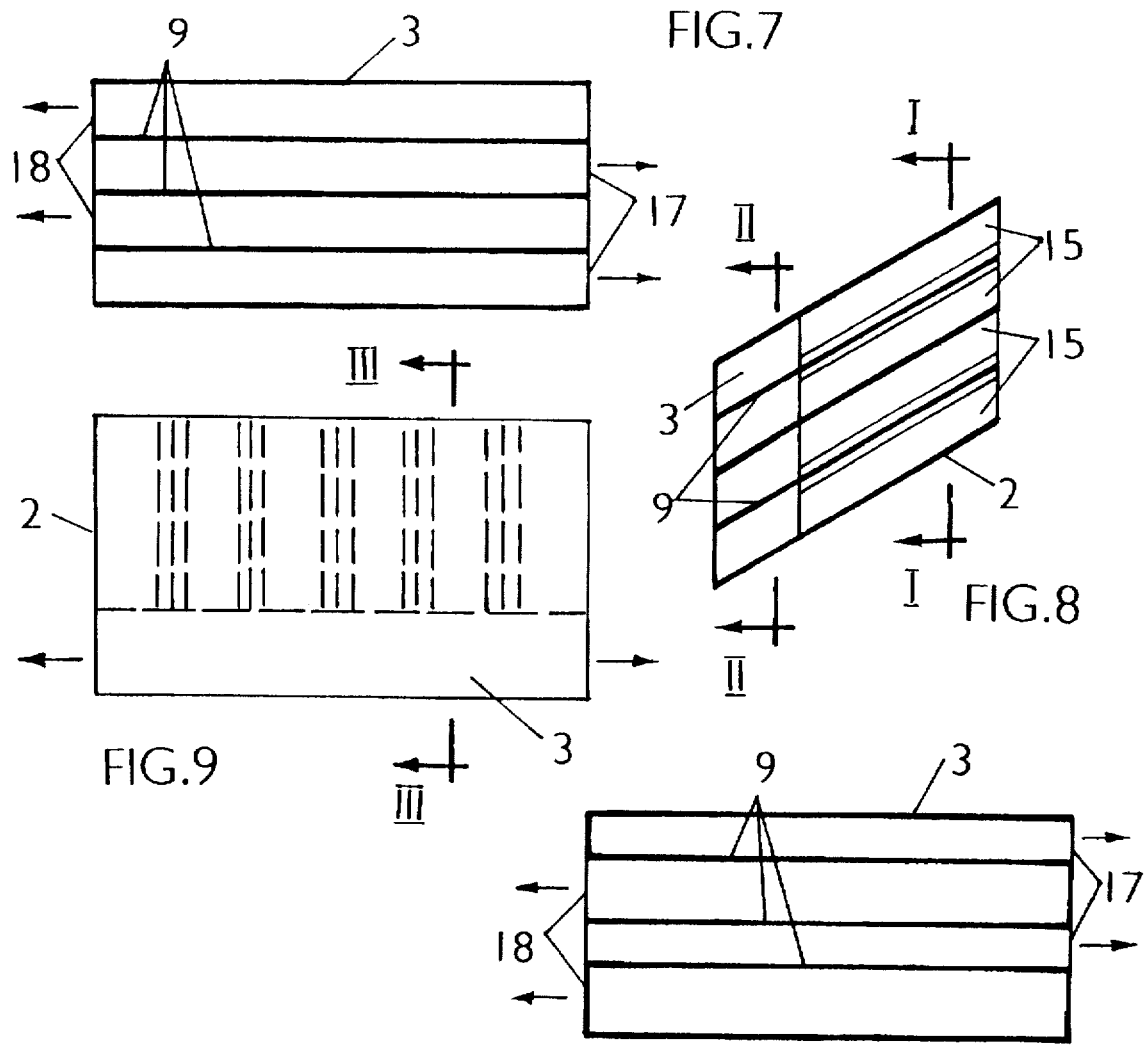

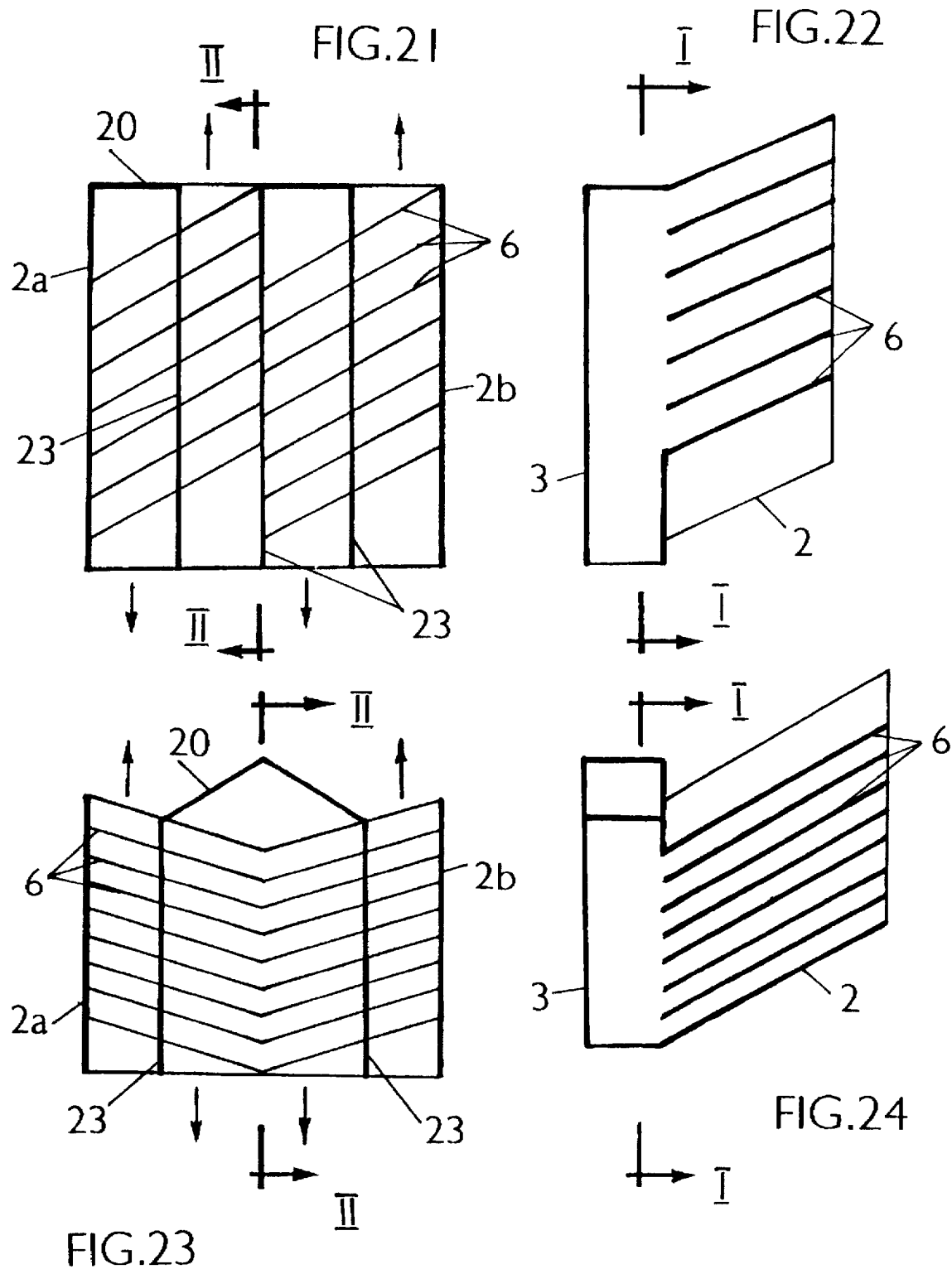

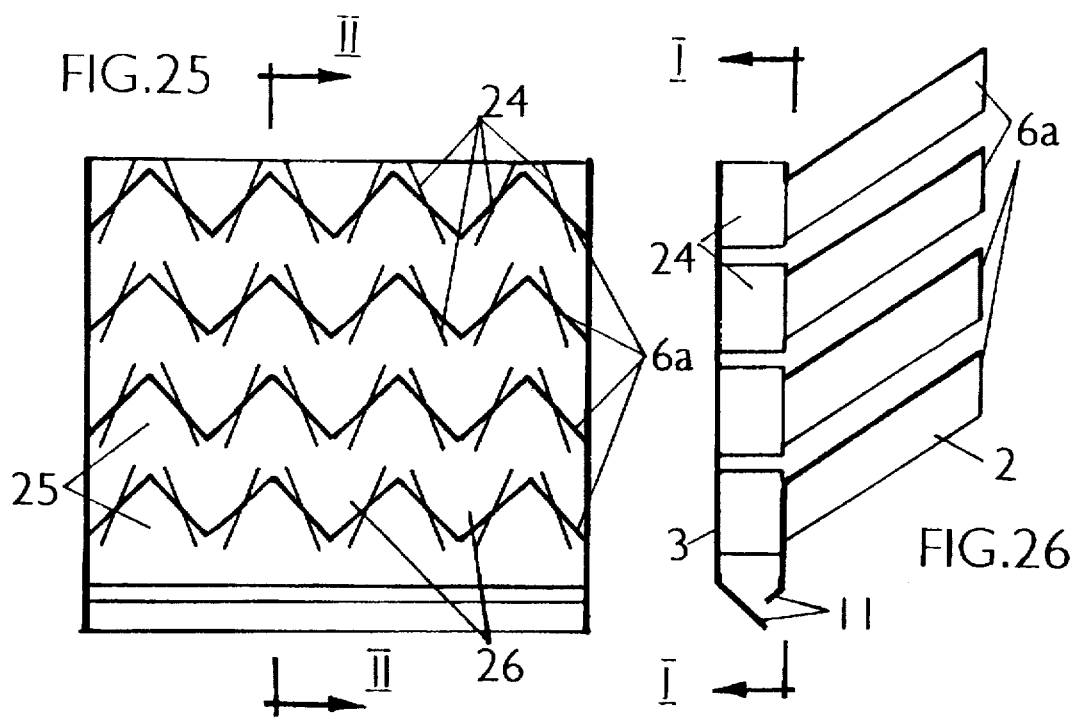
FIG.25
FIG.26
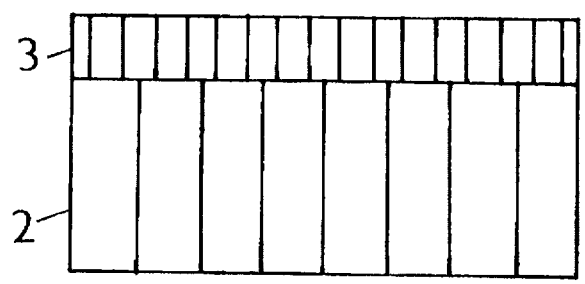
FIG.27
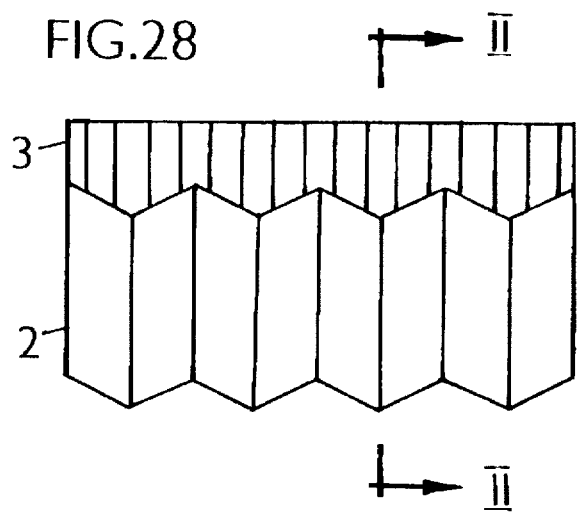
FIG.28
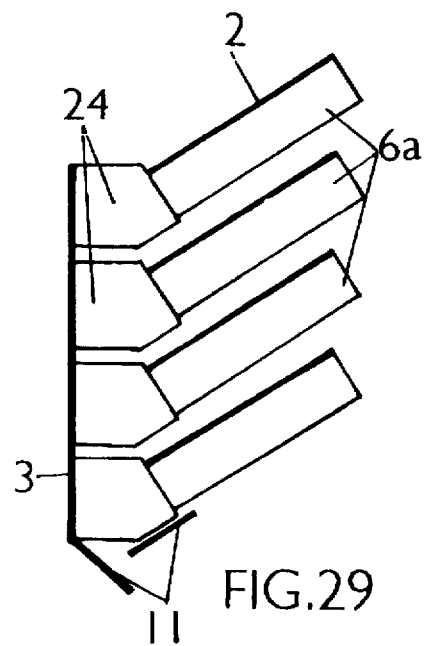
FIG.29

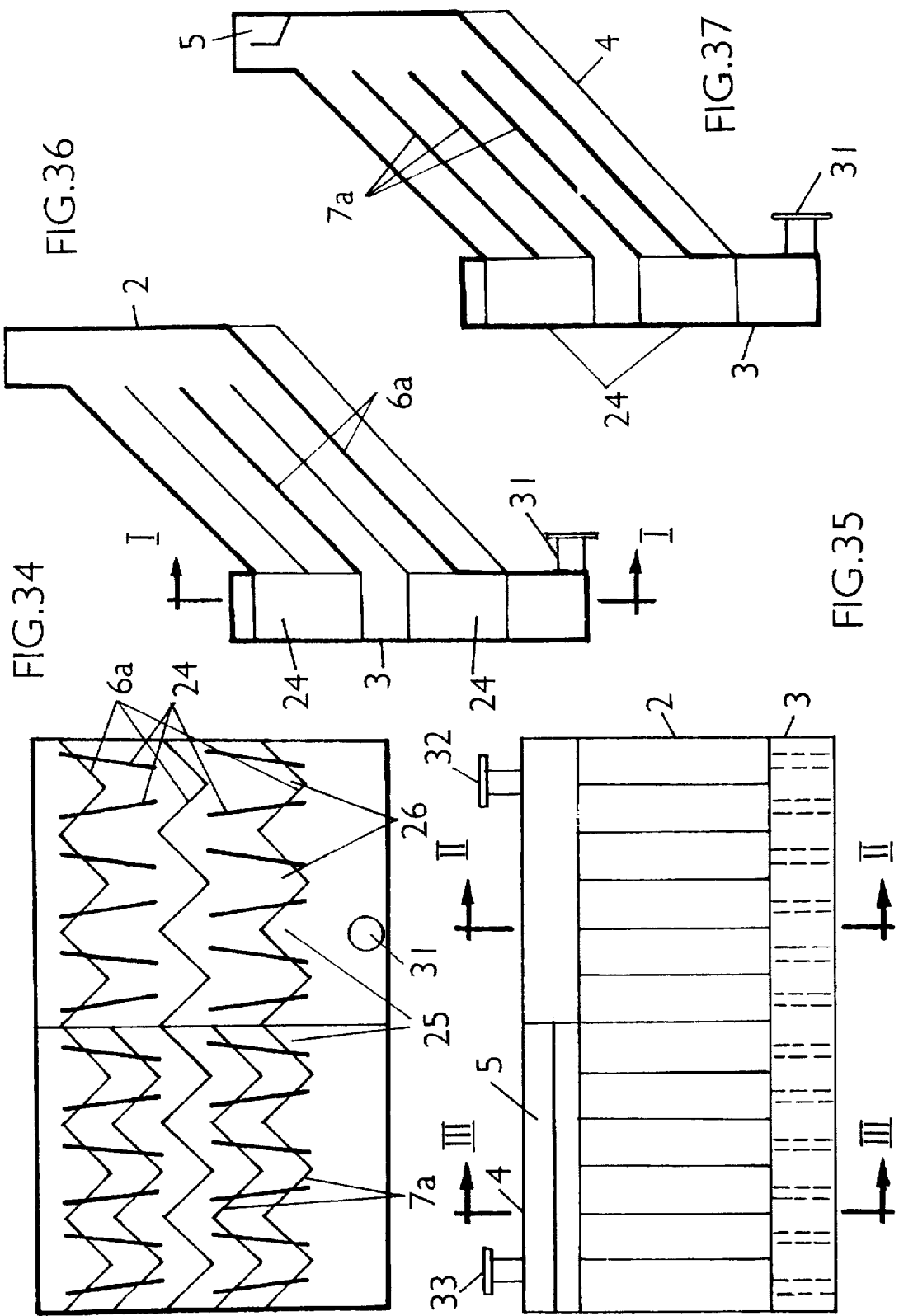

LAMELLAR SEPARATOR

FIELD OF INVENTION

The present invention belongs to gravity separation of solid, liquid, and gaseous materials in chemical processing, microbiological cultivation systems, pollution control, water purification, ore benefication, and other related technologies.

PRIOR ART

The broad class of pertinent gravity separation methods includes "empty" settling tanks with horizontal-longitudinal, vertical, or radial flows, separation devices based on induced vorticity, lamella settlers (also called "tube" or "plate" settlers), and combinations of these separation means. The gravity separation systems can be used to separate dispersed and continuous phases. Dispersed phases can be either solid, liquid, or gaseous phases. Sometimes the same dispersed phase may comprise particles of substantially different nature. For example solid particles may have significantly different size, shape, density, wettability, etc.). Behavior of such particles in many separation apparatuses will be as they were different phases. Liquids and gases represent the continuous phases.

Empty-tank and vorticity based apparatuses for solid-liquid, gas-liquid, solid-gas (or liquid-gas) separation are described in many textbooks, for example, Perry's Chemical Engineers Handbook, Six Edition, Robert H. Perry and Don Green, Editors, McGraw-Hill, Inc., 1984; Metcalf & Eddy's Wastewater Engineering, McGraw-Hill, Co. 1979, Design Handbook of Wastewater Systems, V. N. Samokhin and B. M. Khudenko, Editors, Allerton Press, New York, 1986. These devices are very large and require long retention time for the phase separation. With substantial complications in the design and operation, these devices can be used for three-phase (liquid-solid-gas) separations.

The lamella settlers require smaller area and volume and can be easily adapted for three-phase separations. However, they cannot efficiently separate highly concentrated suspensions, especially comprised of fluffy or flocculent particles. Examples of such suspensions are biomass in microbiological reactors, activated sludge in wastewater treatment, and coagulated and flocculated suspensions in water purification. In three-phase separations, at least two products, usually solid and liquid, are separated in the co-current flow. In the latter case, multiple streams of separated liquid flows and flows of concentrated suspensions at the exit of the lamella package can at least partially remix, thus reducing the separation efficiency.

An example of a three-phase separation is given in the promotional brochure "Plant Series for the Complete Biological Treatment of Domestic Wastewater", the State Design Institute RPI Eesti Projekt, Tallinn, Estonia, 1971. This design comprises an aerated biological reactor with a built-in upflow wedge-shaped sludge separator preceded by a single lamella gas and solid separator. The lamella is inclined and parallel to the sidewall of the wedge-shaped separator. Similar design is shown in the Design Handbook of Wastewater Systems, V. N. Samokhin and B. M. Khudenko, Editors, Allerton Press, New York, 1986 (Russian printing is dated by 1981), but with a lamella made of several flat pieces connected to each other at an angle. Very similar device with either a single or multiple lamellas is described in the U.S. Pat. Nos. 5,033,794 and 5,230,794. These separation apparatuses are submerged in biological reactors containing water (continuous liquid phase), biomass (dispersed solid phase), and air in aerobic or digestion gas in anaerobic reactors (dispersed gaseous phase). The gas containing mixed liquor enters the lamella section from the top and flows down along the inclined plates. Gas is separated near the top of the lamella section and released in the biological reactor. The solids are precipitated from the water along the plate length thus forming a water nappe (or streams) and an underlying concentrated suspension nappe (or streams). It is assumed that predominantly water streams enter the wedge-shaped settling section and the solid concentrate is discharged downward in the biological reactor. The main objectives of the lamella separators are to separate the gas phase to prevent the gas from interfering with the separation process in the wedge-shaped section, and at least to partially separate the biomass from the water. Additionally, U.S. Pat. Nos. 5,033,794 and 5,230,794 teach that a gaslift effect causes the mixed liquor to rotate around the lamella plates thus promoting the formation of granular anaerobic sludge. The disadvantages of these apparatuses are at least partial remixing of the water streams and the concentrated suspension streams at the lower end of the lamella section. Additionally, the gaslift effect increases the material circulation around the lamella plates thus increasing the hydraulic loading and, therefore, decreasing the solid liquid separation in the lamella section.

The objective of the present invention is to provide a simple and efficient method for gravity separation of materials from suspensions, emulsions, and gaseous dispersions in liquid or gaseous continuous phases, including three-phase mixtures. A complementary objective of the present invention is to provide a simple, compact, and efficient apparatus for carrying out the method of this invention. Other objectives will become apparent while discussing the present invention.

SUMMARY OF THE INVENTION

This is a method of separation of materials in a lamella settling process producing streams of separated phases wherein for the purposes of increasing the efficiency of the said separation of materials a step of intercepting the said streams of the separated phases is provided, whereby remixing of the said separated phases is prevented. This is especially beneficial for co-current lamella systems, and also for separation of fine particles, light and fluffy solids, and phases having small difference in density.

The said material can be water, for example in water purification processes, wastewater, technological slurries in manufacturing systems, for example, ore benefication, metallurgical, chemical, food processing, mixture of at least two liquid phases, for example, as in extraction processes, suspensions, as in adsorption, ion exchange, material transportation systems.

The liquid or gas can be a continuous phase which carries the dispersed phases. The dispersed phases can be one or several liquid phases made of liquids limitedly miscible with the continuous phase and each other and having different properties, one or, sometimes, several solid phases, for example, phases made up of coarse or dense particles, very fine particles, and/or light and fluffy particles, and a gas phase. Sometimes, a fine or fluffy fraction of solids can be poorly separable at the conditions when coarse and dense materials easily separate. Under such conditions, the fine material behaves as a constituent of the continuous phase. Mass transfer can occur between the phases. For example, oxygen absorption, digestion gas desorption, various adsorption and ion exchange processes are also possible.

This method can be conducted in apparatus with a lamella settling section, whereby streams of separated phases are formed, and the said step of intercepting the said streams is conducted in at least one interception means. The lamella settling means can be an apparatus with tube elements, or an apparatus with plate elements. The tube elements can be round tubes, rectangular tubes, triangular tubes, polygonal tubes, Z-shaped tubes, curvilinear tubes, polygonal-curvilinear tubes, or shapes combined therefrom. These shapes will be discussed in the section on Preferred Embodiments. The plate elements can be flat elements, corrugated rectangular, corrugated triangular, corrugated polygonal, corrugated curvilinear, corrugated straight, corrugated polygonal-curvilinear, corrugated skewed, or shapes combined therefrom. The said interception means can be vertical baffles, horizontal baffles, inclined lamella plates, contracting and expanding flow cells. The contracting and expanding cells are described in the U.S. Pat. No. 4,472,358 and in the paper by B. M. Khudenko and R. M. Palazzolo "Hydrodynamics of Fluidized Bed Reactors for Wastewater Treatment", Proceedings of the First International Conference on Fixed Film Biological Processes, Sponsored by the University of Pittsburgh in cooperation with US NSF, US EPA, US Army Corps of Engineers, Apr. 20–23, 1982, Kings Island, Ohio. These two documents are made part of the present application by inclusion.

The present method can be further improved by combining the step of intercepting at least two of the said streams of the separated phases with a step of a secondary material separation. The secondary separation step can be a lamella settling methods or methods with contracting-expanding flows as described in the U.S. Pat. No. 4,472,358. The method can be even further improved by further providing a tertiary step of gravity separation of materials, the said tertiary separation step can make use of an empty-tank, lamella, or contracting-expanding flow separation principles. The respective apparatus for conducting method of separation of materials with combined steps of intercepting at least two of the said streams of the separated phases and of the secondary material separation includes a secondary interception-separation means, for example, lamella separators, and separators with expanding and contracting cells. An empty tank, lamella separators, or separators with contracting and expanding cells can also be used in the tertiary separation step.

The tertiary step of materials separation can follow the said step of material interception which is not combined with the material separation. In such a case, the tertiary separation step can make use of an empty-tank, lamella, or contracting-expanding flow separation principles. An empty tank, lamella separators, or separators with contracting and expanding cells can also be used in the tertiary separation step.

BRIEF DESCRIPTION OF THE DRAWINGS

FIGS. 1–4 are vertical crossections of apparatuses for gravity separation of materials.

FIG. 5 is a crossection of an apparatus along the line I—I in the FIG. 4.

FIG. 6 is a crossection of an alternative apparatus along the line I—I in FIG. 8.

FIG. 7 is a crossection of an alternative apparatus along the line II—II in FIG. 8.

FIG. 8 is a crossection of an alternative apparatus along the line III—III in FIG. 9.

FIG. 9 is a plan view of an alternative apparatus shown in FIGS. 6–9.

FIGS. 10–11 are crossections of an apparatus similar to that shown in FIGS. 6–9 but with different proportions of the elements.

FIG. 21 is yet another alternative embodiment shown in a crossection along the line I—I in FIG. 22.

FIG. 22 is yet another alternative embodiment shown in a crossection along the line II—II in FIG. 21.

FIG. 23 is one more alternative embodiment shown in a crossection along the line I—I in FIG. 24.

FIG. 24 is a crossection along the line I—I in FIG. 22.

FIG. 25 is an alternative embodiment shown in a crossection along the line I—I in FIG. 26.

FIG. 26 is a crossection along the line I—I in FIG. 25.

FIG. 27 is a plan view of the embodiment shown in FIGS. 25–26.

FIG. 28 is a plan view of a modification of the apparatus shown in FIGS. 25–27.

FIG. 29 is a crossection along the line I—I in FIG. 28.

FIG. 34 is yet one more apparatus shown in a crossection along the line I—I in FIG. 36.

FIG. 35 is a crossection along the line II—II in FIG. 35.

FIG. 36 is a crossection along the line III—III in FIG. 35.

FIG. 37 is a plan view of the embodiment shown in FIGS. 34–37.

DETAILED DESCRIPTION OF EMBODIMENTS

Figure 1:
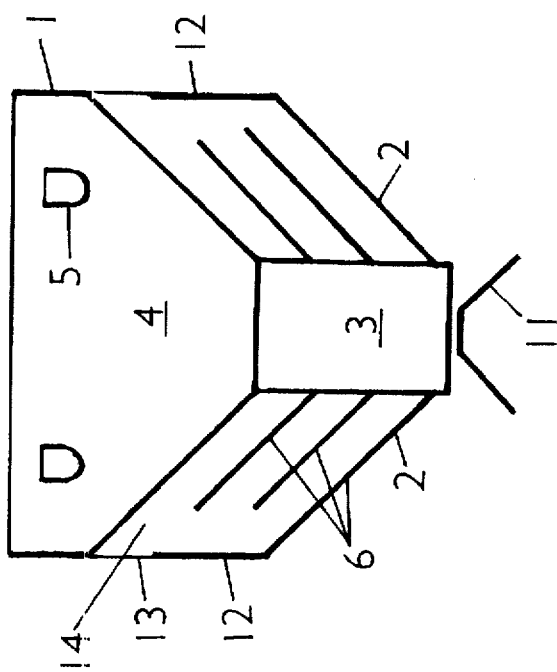

FIG. 1 illustrates an apparatus for the three-phase material separation. The apparatus comprises a body 1, two lamella sections with plates or tubes 6 for the primary materials separation, a section 3 for the interception of the separated streams of materials and optionally for the secondary separation of materials, a tertiary separation section 4, the troughs 5 for collecting the clarified liquid, and an optional gas deflection baffle 11. Various designs of sections 2,3 and 4 are described later. This apparatus is submerged in a reactor filled with a suspension of solid particles. This suspension can also have gas bubbles in it. The said suspension with bubbles enters the section 2 at the top of plates 6 and flows down along the plates 6. Gas bubbles separate from the continuous liquid phase by floating up in the upper reaches of the spaces between the plates 6, while the solid particles partially separate from the liquid by settling along the plates length. Separated bubbles, solids, and the liquid form distinct multiple streams. In the compartment 3, liquid and solid streams are intercepted, the solid streams are allowed to fall down, while the combined liquid streams flow up in the tertiary separation section 4, wherein the residual solids are removed from the liquid and sink in the section 3 and further in the reactor. The density of material on the top of plates 6 is greater than that in the reactor. This difference causes the gravity forces which support rotation of materials around the plates 6. Material rotation of such nature is described in the U.S. Pat. No. 4,472,358. The baffle 11 prevents the gas bubbles from entering sections 3 and, subsequently, 4. Gas bubbles flow along the section 2 and create a gaslift effect which increases the material rotation around the plates 6. This effect is described in the U.S. Pat. Nos. 5,116,505 and 5,230,794. Materials rotation around baffles 6 is necessary for creating the downward flow between these baffles. However, excessive rotation increases the hydraulic load on the section 2 and reduces the separation effect, especially, for light and fluffy solid particles which remain in suspension and largely pass through the section 2. Even finer gas bubbles can be substantially entrained in the downward flow between plates 6. In the absence of the stream interception means in the section 3, intensive rotations also cause remixing of the steams separated between the plates 6. Additionally, many stream interception devices described later can control the intensity of the material rotation around the plates 6 thus reducing or eliminating the negative effects of the material rotations in the system.

Figure 2:
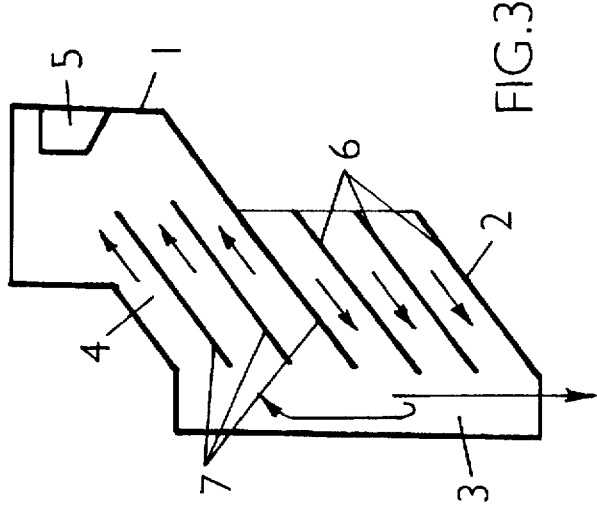

FIG. 2 shows a modification of the apparatus of FIG. 1 which has additional vertical baffles 12, openings for the influent 13, and a gas separation zone 14. The suspension with gas bubbles enters this apparatus through the openings 13. Gas separation occurs mainly in the zone 14. The rest of the operation is the same as that of the embodiment of FIG. 1.

Figure 3:
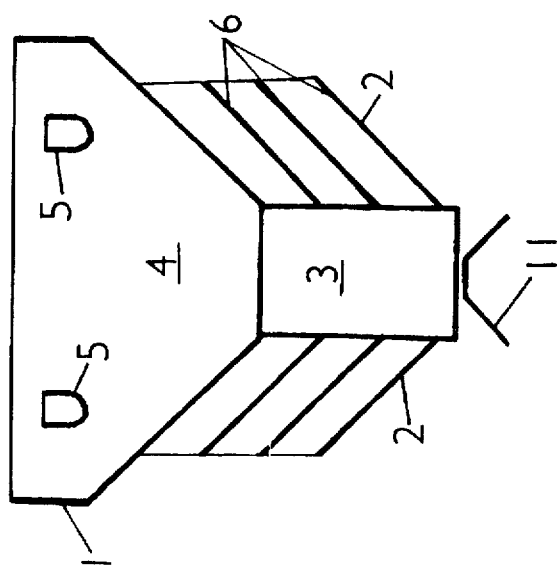

FIG. 3 illustrates another modification of the apparatus shown in FIG. 1 which has a single lamella section 2 and a lamella filled section 4. Sections 2 and 4 form a two-path lamella settler with the vertical arrangement of the sequential separation sections. Operation of this apparatus is also similar to the embodiment of the FIG. 1 with the exception of the lamella filled section 4 which may be used at a greater loading rate than the empty tank section.

FIGS. 4 and 5 present an embodiment with an interception device having pockets 8 formed by adding a bent portion 9 to the plates 6. Side openings 10 for sludge discharge are also provided. The apparatus is operated similarly to the embodiment of FIG. 1. Flat streams of clarified liquid and underlying streams of concentrated solids are formed on each plate 6. These streams are intercepted in the section 3. The clarified stream is directed in the optional section 4, where it is, optionally, additionally clarified, and is collected in the collection means 5. The elimination of remixing of the separated phases is provided by the stream interception means in the embodiment of FIGS. 4 and 5.

FIGS. 6–9 show another embodiment of the present invention comprising the lamella section 2 and the stream interception section 3. The lamella section is assembled from two layers of Z-shaped tubes 15 (any number of such layers can be used). Tubes have an upper portion 15a, a connector 15b and a lower portion 15c. Blind portions 16 of the section 2 are blocked or filled. Similarly to the previous embodiment, the interception section 3 is made of parallel horizontal plates 9. However, opposite side discharge openings 17 for the separated solid and 18 for the separated liquid are provided. In operation, the suspension enters the section 2 from the upper end of tubes 15. Gases, if any, are separated in the upper reach of these tubes and are evacuated from the apparatus. The settlable solids precipitate in the tube 15 and slide via connector 15b from the portion 15a in the portion 15c. At the lower end of tubes 15, the separated liquid and solid streams in tube portions 15a and 15c are intercepted and independently discharged from the section 3 via openings 17 and 18. The solids can remain in the reactor, the separated liquid can be further collected and evacuated from the reactor.

FIGS. 10 and 11 show a modification of the previous embodiment which differs only by the relative sizes of the upper 15a and lower 15c portions of the tubes 15. In this case, the lower tube portion is larger than the upper, whereas in the previous embodiment these portions are equal. Larger lower portion is advantageous for settling fluffy sludges with high sludge index. For coarse and heavy particles, lower tube portion can be smaller than the upper portion.

Figure 12:
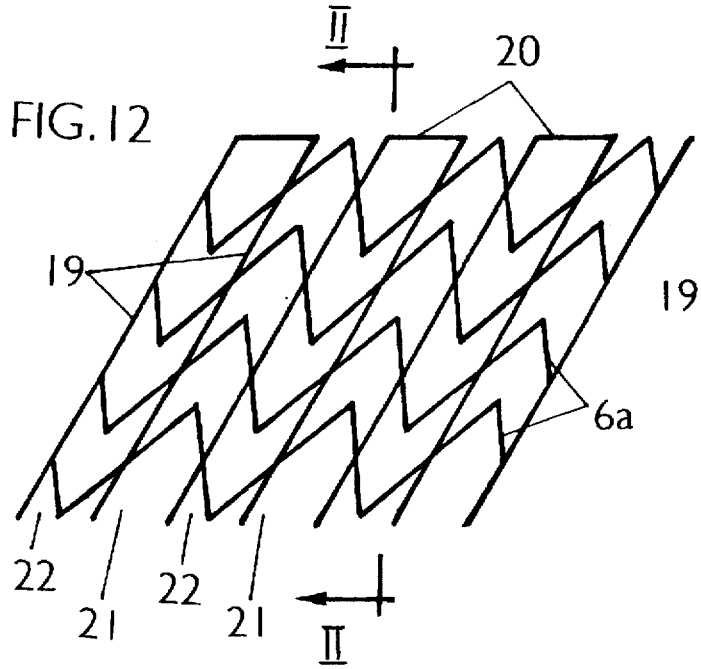
FIG. 12 is a view along lines I—I in FIG. 13.
Figure 13:
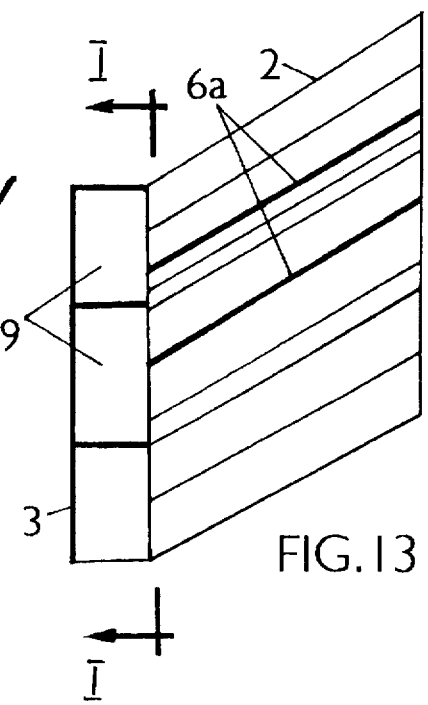
FIG. 13 is a view along lines II—II in FIG. 12.
Figure 14:
FIGS. 14–18 are variants of the settling plates usable in the embodiment type depicted in FIGS. 12–13.
Figure 15:
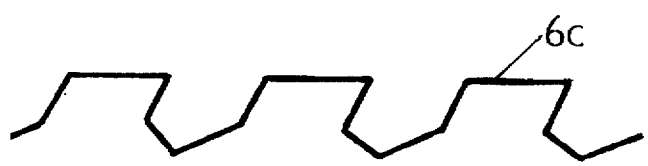
Figure 16:
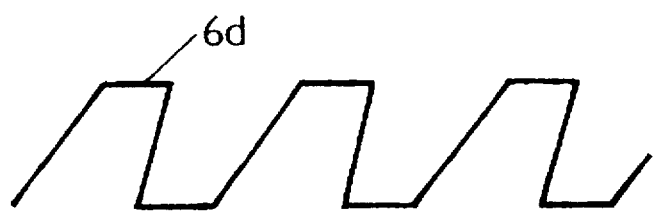
Figure 17:
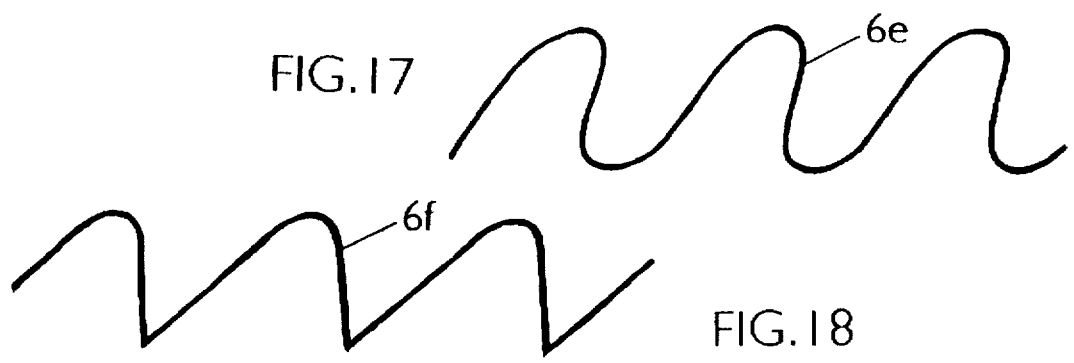
Figure 18:
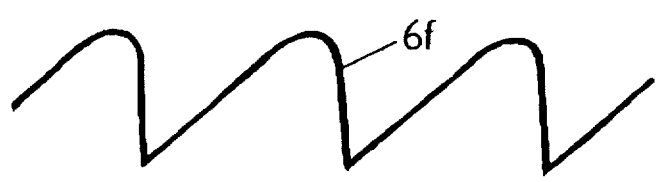

FIGS. 12 and 13 show another modification of the lamella section 2 comprising skewed corrugated triangular plates 6a and the stream interception section 3 also comprising lamella separator made of plate elements 19. The skew in the triangular folds of the plates 6a and the inclination of plates 19 are selected to form intermittent compartments 21 for intercepting the liquid and 22 for intercepting solids. Optional closures 20 are provided at the top of compartments 22. This embodiment can be a part of an apparatus given in FIGS. 1, 2, or 3, or be used in other arrangements. In operation, the suspension enters the section 2 from the upper end of plates 6a. Gases, if any, are separated in the upper reach of these plates and are evacuated from the apparatus. The settlable solids precipitate between the plates 6a in the lower portions of the corrugated plates and slide down to the stream interception section 3. The liquid and solid phases are independently intercepted into compartments 21 and 22. Lamella arrangement of the intercepting plates 19 provides additional phase separation capacity to the stream interception device. Intercepted and additionally separated solid and liquid phases can be directed for discharge, or otherwise as needed for particular application.

FIGS. 14–18 illustrate alternative configurations to the corrugated skewed triangular shape of plates shown in FIGS. 12 and 13. The illustrated shapes are skewed rectangular (6b), skewed polygonal (6c), skewed trapezoidal (6d), skewed sinusoidal (6e), and combined curvilinear-triangular (6f). These and many other shapes can also be developed and used by skilled artisans to meet the function described herein.

Figure 19:
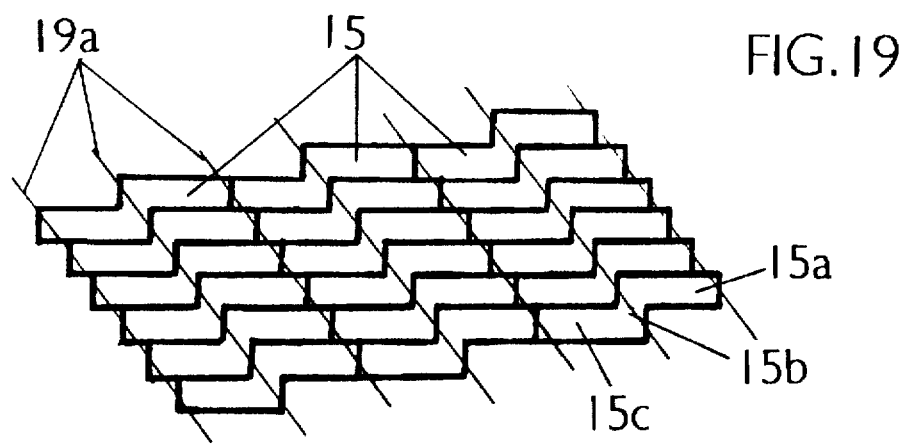
FIGS. 19–20 are additional variants of the settling elements for the embodiment type depicted in FIGS. 12–13.
Figure 20:
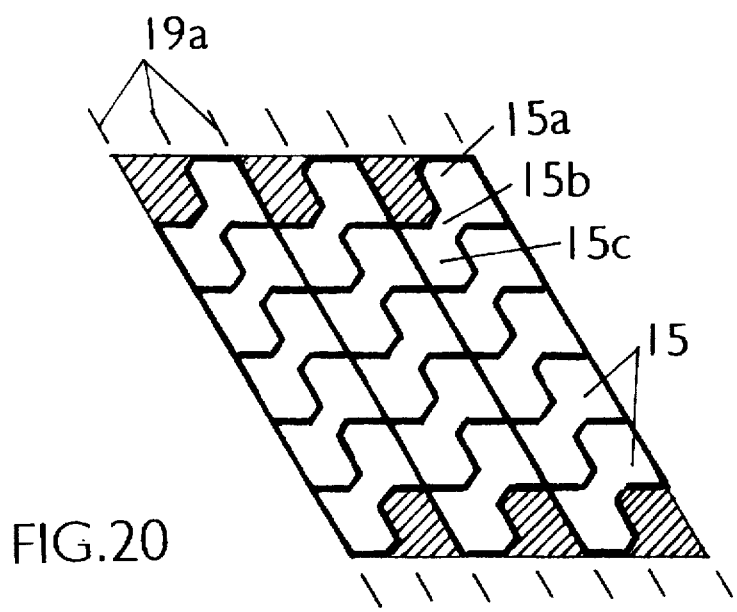
Figure 30:
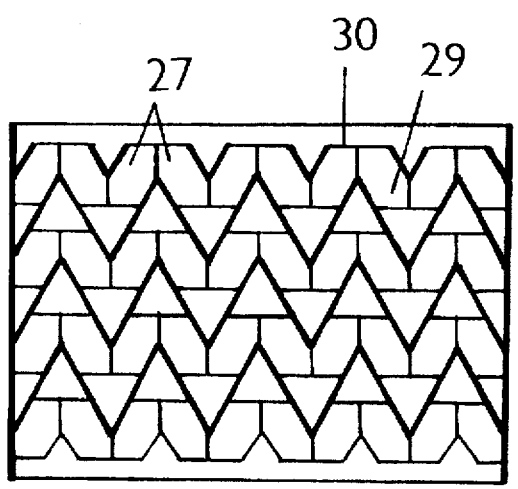
FIG. 30 is yet one more embodiment shown in a crossection along the line I—I in FIG. 31.
Figure 31:
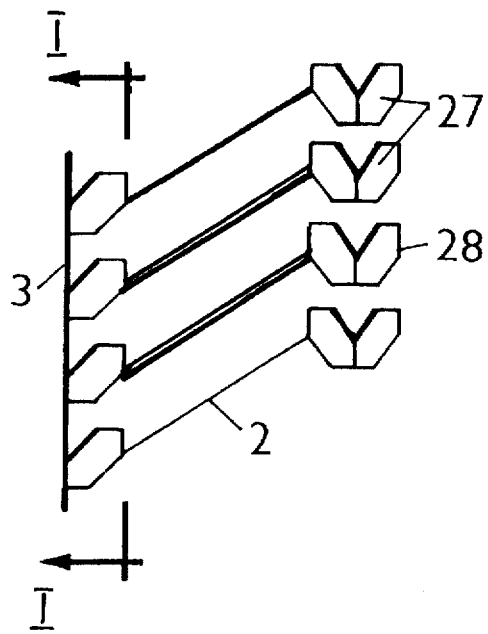
FIG. 31 is a crossection along the line II—II in FIG. 33.
Figure 33:
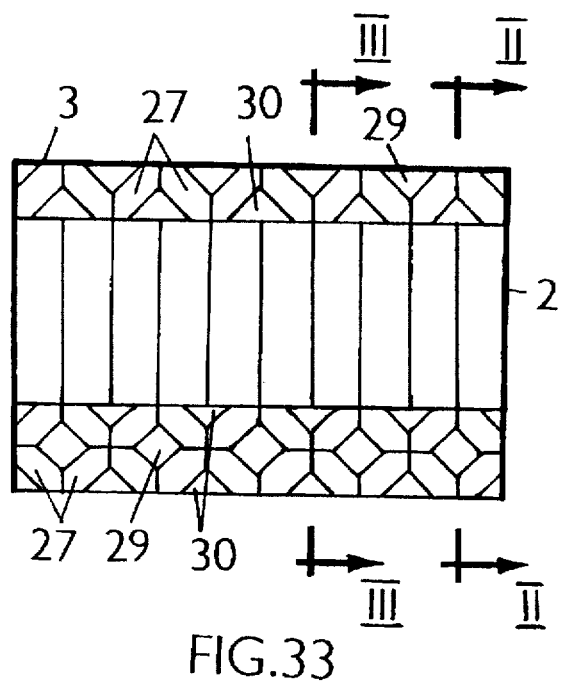
FIG. 33 is a plan view of the embodiment shown in FIGS. 30–33.
Figure 32:
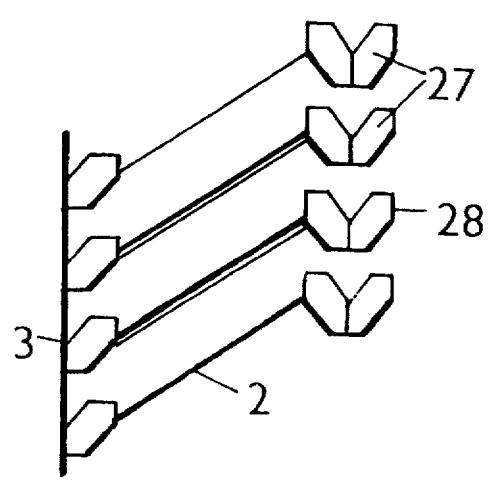
FIG. 32 is a crossection along the line III—III in FIG. 33.

FIGS. 19 and 20 show alternative tube type lamella sections 2. They can be called, for example, rectangular Z-shape (FIG. 19) and a skewed Z-shaped (FIG. 20) tubes. These tubes are similar to those shown in FIGS. 6 and 11. They also have upper portion 15a, connector 15b and lower portion 15c. Operation of individual tubes is the same as in FIGS. 6 and 11. The relative arrangement of these tubes is staggered and as such differs from the embodiment of FIGS. 6 and 11. The staggered configuration accommodates the use of the inclined plate lamella interceptor 3, which also combines the separation function. In FIGS. 19 and 20, lines 19a show the position of the inclined plates of the phase interceptor relative the positions of the settling lamella tubes 15 in the section 2. Separations of various suspensions can be accommodated by varying the widths of sections 15a and 15c.

FIGS. 21 and 22 show yet another embodiment of the invention comprising a lamella separation section 2 with plates 6 inclined along and across the flow of the suspension being separated into its constituent phases, and the stream interception section 3 with vertical interception baffles 23. Optional caps 20 can be provided over the portion of the stream interceptor carrying the solid phase. There are two compartments of the lamella separator 2a and 2b divided by a vertical middle wall. This embodiment is operated similarly to the devices previously described. The separated solid material is directed to the left side of each lamella separation compartments 2a and 2b. Vertical interception baffles 23 intercept the separated streams which can be further directed as needed for a particular application.

FIGS. 23 and 24 show an embodiment similar to the previous one. There are also two compartments of the lamella separator 2a and 2b having oppositely inclined plates 6. Compartments 2a and 2b are not divided from each other. This embodiment is operated similarly to the device previously described. The separated solid material is directed to the center of the device. Vertical interception baffles 23 intercept the separated streams which can be further directed as needed for a particular application. By varying horizontal spacing between baffles, treatment of suspensions with various concentrations and particle properties can be accommodated, as they may form smaller or larger volume of the concentrated solid streams.

FIGS. 25-27 and 28-29 show two similar embodiments with another modification of the stream interception section 3 coupled with the already described lamella separation section 2 with corrugated triangular plates 6a. The stream interception section 3 is provided with oppositely inclined baffles 24 as described in the U.S. Pat. No. 4,472,358. The differences between the embodiments of FIGS. 25-27 and 28-29 is in the shape of the lamella plates 6a and the inclined plates 24 in the stream interception section 3. These differences are understood from the respective drawings. Going upward, spaces between plates 24 form contracting 25 and expanding 26 cells. Solid particles and liquid flows rotate around baffles going upward in the contracting cells and downward in the expanding cells. Solid material accumulates in the expanding cells and is removed from the contracting cells thus providing additional material separation. The separated material is removed downward through the slot formed by the gas deflection baffles 11. The intercepted and additionally clarified liquid flows up.

FIGS. 30-33 present another modification of apparatus with the stream interception section 3 made of contracting 29 and expanding 30 cells, the said cells are formed by hexagonal plates 27 and are tridimensional. This cell arrangement is also described in the U.S. Pat. No. 4,472,358. The lamella separation section 2 is made of the triangular corrugated plates 6a. Additionally, a special gas separation and preconcentration section 28 also made of contracting 29 and expanding 30 cells formed by hexagonal plates is optionally provided before the lamella separation section 2. The apparatus can be provided with gas deflection baffles located under section 3 similarly to the previously described embodiments. This device is operated similarly to the previous one. Additionally, gases are substantially removed and liquid and solid phases are partially separated in the preconcentration section 28 prior to the suspension entering the lamella separation section 2. Accordingly, the solids loading on the lamella separation section 2, and on the combined stream interception and separation section 3, and on other separation steps, if any, is reduced.

FIGS. 34-37 illustrate another two-path apparatus with the corrugated plates 6a in the lamella separation section 2, contracting 25 and expanding 26 cells formed by the oppositely inclined baffles 24 in the stream interception section 3, and the corrugated plates 7a in the lamella separation section 4. Section 4 is also provided with an effluent collection trough 5 and the effluent pipe 33. The influent pipe 32 attached to the section 2, and the solids discharge pipe 31 are also provided. This is a free standing embodiment. However, it can be modified similarly to the previously described apparatuses for submerging in a reactor. The apparatus is operated as follows. The influent is fed via pipe 32 in the lamella separation section 2 flows along the plates 6a, the gas is released at the entrance portion of the section 2, and the solids are precipitated along the plates 6a, separated streams of the solid concentrate and the clarified liquid are formed. These streams are independently intercepted in the section 3 with the use of the system of contracting 25 and expanding cells 26, which also provides additional solid-liquid separation. The partially clarified liquid goes in the lamella-fitted section 4 wherein the solid-liquid separation occurs in a counterflow. The clarified liquid is collected in the trough 5 and is discharged as an effluent via pipe 33. The solids slide down and together with the previously formed solid bearing streams are directed in the lower portion of the section 3 and discharged via pipe 31.

The general teaching of this invention and the described embodiments have great advantages over the prior art. Control over the remixing of the separated streams of material by the use of a novel process step and a novel means increases the efficiency of materials separation. The efficiency of material separation is further improved by combining the step of intercepting the streams of the primarily separated material with the separation step conducted in the said interception means. The present invention affords efficient treatment of highly concentrated suspensions, and suspensions with light and fluffy solid particles. Three phase separations, including suspensions carrying floatable liquid droplets and gas bubbles, are also possible. The apparatus in accordance with this invention is very compact. It is very simple to manufacture, transport, install, and operate.

Experimental data and analysis of the present system showed that the system is technically and economically feasible and advantageous over the prior art. The basic embodiments described herein are examples of possible advantageous systems using various types of the primary phase separators in combination with various types of stream interceptors. Additionally, the stream interceptors can also provide the phase separation capacity. Various other modifications are also possible. It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

What is claimed is:

1. A lamellar separator for clarification of solids containing aqueous influents comprising:
    a. a primary clarification section provided with inclined co-current lamellas having upper and lower for receiving said solids containing aqueous influents at the upper ends of the said lamellas and discharging streams of concentrated solids and streams of clarified liquid at the lower ends of the said lamellas, and
    b. an interception section attached to and in hydraulic communication with the said primary clarification section at the lower ends of the said lamellas, the said interception section housing at least one interception means, whereby the said streams of concentrated solids are combined into a flow of concentrated solids and the said streams of clarified liquid are combined into a flow of clarified liquid, and the said flow of concentrated solids and the said flow of clarified liquid being evacuated from said lamellar separator without intermixing.

2. The lamellar separator as claimed in claim 1, wherein the said lamellas are selected from the group comprising tube elements, and plate elements.

3. The lamellar separator as claimed in claim 2, wherein the said tube elements are selected from the group comprising round tubes, rectangular tubes, triangular tubes, polygonal tubes, Z-shaped tubes, curvilinear tubes, polygonal-curvilinear tubes, or shapes combined therefrom.

4. The lamellar separator as claimed in claim 2, wherein the said plate elements are selected from the group comprising flat elements, corrugated rectangular elements, corrugated triangular elements, corrugated polygonal elements, corrugated curvilinear elements, corrugated straight elements, corrugated polygonal-curvilinear elements, corrugated skewed elements, or shapes combined therefrom.

5. The lamellar separator as claimed in claim 1, wherein the said interception means are selected from the group comprising vertical baffles, horizontal baffles, inclined lamella plates, baffles forming contracting and expanding flow cells.

6. The lamellar separator as claimed in claim 1, wherein the said interception section is also a secondary clarification section.

7. The lamellar separator as claimed in claim 6, wherein the said interception section is provided with an interception means selected from the group comprising lamella plates, baffles forming expanding and contracting cells.

8. The lamellar separator as claimed in claim 6 and further providing a tertiary clarification section connected to and in hydraulic communication with an upper portion of the said interception section.

9. The lamellar separator as claimed in claim 8, wherein the said tertiary clarification section is selected from the group comprising empty tank sections, lamella sections, and sections provided with baffles forming contracting and expanding cells.

* * * * *